Nov. 24, 1959     G. A. TINNERMAN     2,913,950
THREADLESS NUT HAVING A PLURALITY OF TEETH FOR
ACCOMMODATING STUDS OF VARIOUS DIAMETERS
Filed July 20, 1956

Inventor
GEORGE A. TINNERMAN
By ~ *Featherstonhaugh & Co.*
Attys.

United States Patent Office 2,913,950
Patented Nov. 24, 1959

2,913,950

THREADLESS NUT HAVING A PLURALITY OF TEETH FOR ACCOMMODATING STUDS OF VARIOUS DIAMETERS

George A. Tinnerman, Lakewood, Ohio

Application July 20, 1956, Serial No. 599,258

3 Claims. (Cl. 85—35)

This invention relates to fasteners, and particularly fasteners which may be projected onto the shank of a stud or bolt without screw threading.

Fasteners of this general type have been used for a substantial period and are generally formed from a sheet steel plate having an orifice therein with usual reslient prongs projecting from the periphery of the orifice in relatively opposed relation to form an automatic gripping means for a stud when the shank thereof is projected into the orifice and is engaged in gripping relation by the prongs against withdrawal. This type of fastener is very useful but in the usual course such fasteners may only be used with a stud of given diameter or with studs whose diameters vary only slightly from one another. This means that it is necessary to provide a great many sizes of fastener in relation to the many varied diameters in studs.

The present invention overcomes the general disadvantage outlined above by providing a fastener which when formed in one size will accommodate studs varying in diameter to a substantial degree and consequently one size of fastener may be used in conjunction with a number of different diameter studs. It also incorporates in a fastener of this type a sheathing, preferably of yieldable character, which will convert the fastener to many uses and with many sizes of stud, and provides a fastener which can be readily made economically and which lends itself to automatic production.

The invention will be clearly understood by reference to the following detailed specification taken in conjunction with the accompanying drawings.

Figure 1:
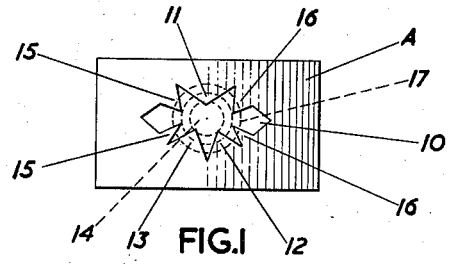
Fig. 1 is a plan view of the basic fastener according to the present invention.

Referring to the drawings, A indicates a rectangular fastener element formed from strip steel and which may be produced in strips and cut to size. This body may be formed from hardened spring steel if desired but may be produced from low carbon or high carbon heat treated steel, it being only necessary that the fastener is given a hardness sufficient to provide for a locking bite with respect to a stud with which it is to cooperate. The low carbon fastener will, of course, be usable in respect of plastic or soft die cast studs and the high carbon for hard studs such as chrome finished studs and the like. Alternatively, it may be formed from stainless type steel for use where corrosion resistance is required.

The element A, according to the present invention, is provided with an elongated slot 10 which in basic form is plotted on a diamond shape or elliptical shape such that the slot in itself is defined by a plurality of teeth, from end to end, including the teeth 11, 12 and 13, which as shown are located at the middle of the slot and designed to cooperate with a stud shank 14, illustrated in dotted lines, of relatively small diameter. The fastener is pushed over the shank of the stud and the teeth yield in the direction of movement of a shank 14 relatively to the fastener body A and when the fastener is pushed home, these teeth, biting into the shank will prevent retraction of the stud. On each side of the centrally located teeth 11 to 13 inclusive are the flanking pairs of teeth 15 and 16 respectively which are designed to form the fastening means for studs of large diameter such as a stud of the diameter indicated in Fig. 1 at 17 in dotted lines, which is no greater than the overall width of the slot taken from the base of the teeth 11 and that of the opposite cooperating teeth 12 and 13.

Figure 2:
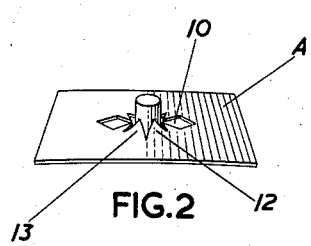
Fig. 2 is a perspective illustration of the fastener shown gripping the shank of a stud of small diameter.
Figure 3:
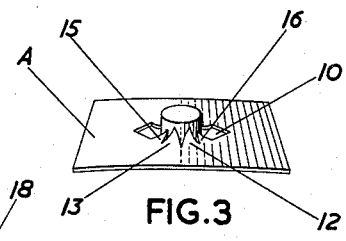
Fig. 3 is a view similar to Fig. 2 showing the same fastener gripping a stud of large diameter.

As shown in Fig. 2, a stud to be secured by the fastener A has its shank projected through the slot 10 and is being gripped by the teeth 12 and 13 on one side and correspondingly by the tooth 11 (not shown in Fig. 2) on the opposite side of the shank, whereas in Fig. 3 the teeth 12 and 13, which is the case also for the tooth 11, have been pressed aside by the shank of a stud of larger diameter and which is being gripped by the teeth 15 and 16. It should be noted in this connection also that due to the effect of the elongated slot in the thin flexible metal fastener base, the projection of a stud through the opening for securement purposes also has the effect of causing fastener A to arch slightly in the direction of projection of the stud. In result, therefore, the fastener ordinarily will provide for axially applied tension which, in the case of a fastener of the prior art, formed from annealed spring steel, is achieved by specially arching the fastener in a requisite step prior to the hardening operation with its attendant costs.

Figure 4:
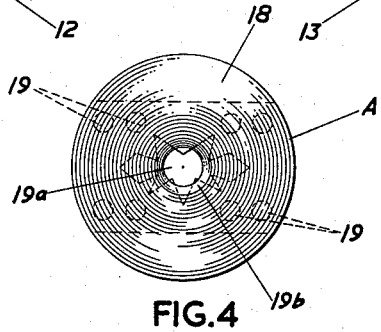
Fig. 4 is a plan view of a modified form of stud having the basic fastener encased in an annular sheath.

In Fig. 4 the fastener A is imbedded in a body of plastic material 18 of yieldable or pliant nature such as a polyethylene, polystyrene, neoprene, etc. and which may take the form of silicones. This is bonded to the fastener A and which may include orificing the fastener at various points 19 to permit the covering material to pass through in integral union from one side of the fastener to the other. The body material 18 may substantially imbed the teeth and because of the generally converging arrangement of the teeth and the fact that the teeth are substantially similar in length, the stud receiving orifice 19a is preferably made of a diameter substantially to correspond with that of the smallest diameter stud to be received by the fastener. Thus, having regard to the yieldable nature of the body material 18, it will be clear that even in the case of the smallest diameter stud, the body material adjacent the orifice will yield with the teeth and surround and engage the shank of the stud held by the fastener in an intimate sealing engagement while the base of the body will engage a surface of a part held by the fastener in like engagement. Preferably the entrance to the receiving orifice is chamfered as at 19b to act as a guide to the stud as it is directed to orifice 19a so as readily to associate the fastener with the stud rapidly. This provides a fastener which when placed in function will effectively seal the assembled unit to which it is applied at the point of assembly or joining by the fastener. Moreover, due to the nature of the body material 18, the opening 19a will expand in the case of a stud of larger diameter. However, as shown in dotted lines 21a in Fig. 5, the orifice 21 might be made substantially to correspond to the size of the largest diameter stud usable.

Figure 5:
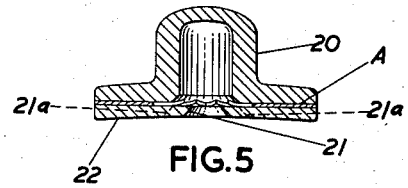
Fig. 5 is a transverse sectional view of a further alternative form of fastener employing a bonded housing therewith.
Figure 6:
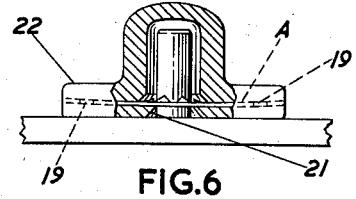
Fig. 6 is a view similar to Fig. 5 showing the fastener applied to the shank of a stud and encasing the shank and disposed in sealing relation with an element to which the fastener is applied.
Figure 7:
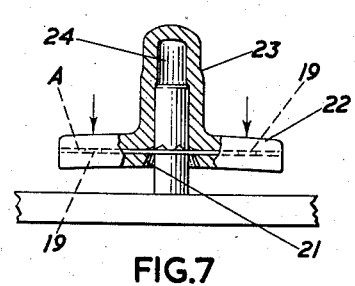
Fig. 7 is a partially sectional view of a fastener of the present invention employing an alternative form of bonded housing.

As shown in Fig. 5, the fastener is imbedded in a plastic material such as of the kind indicated above and which is domed to provide an enclosing housing 20 on one side and formed with a chamfered opening 21 leading to the teeth of the fastener which may act as a general guide to the stud. The base 22 of the covering material 20 may be slightly concaved as shown to impart constant axially applied tension to the union, when the stud is inserted, comparable to that provided by the compression of a coil spring or flattened leaf spring. Thus, the housing 20 serves, as shown in Fig. 6, not only wholly to encase the stud after it has passed through the fastener, thus completely sealing the joint and enclosing the stud at the point where union is effected by the fastener, but, by the base formation as well, gives a spring loaded effect on the assembled joint. Alternatively, as shown in Fig. 7, the housing 23 may be such as to provide a socket 24 of less diameter than the stud to achieve upon yielding a very tight sealed encasement of the stud.

Figure 8:
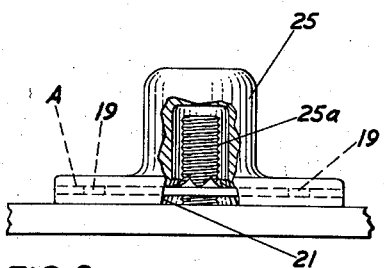
Fig. 8 illustrates in side elevation and partly in section a fastener made in the form of a hub-cap for small vehicles adapted to engage the projecting end of an axle thereof and which may be screw threaded.

In Fig. 8, I have illustrated a fastener similar to the disclosures of Figs. 5 and 6 wherein the fastener is formed as a hub-cap 25 which may be applied to the axles of small vehicles, the internal housing of which is of sufficient size to accommodate a variation in size of axle and wherein the plastic covering selected may be somewhat harder in character. This figure serves also to illustrate that a screw threaded shank 25a may be used as well as a plain shank, and in either case it will be apparent that the gripping union may readily be effected by driving or pushing the fastener on the stud.

It should be understood that when I refer to an elongated slot defined by teeth spaced apart from one another longitudinally thereof and across the slot from one another that the slot is, as indicated, plotted on a basic diamond or elliptical shape such that the theoretical outline thereof is plotted substantially to intersect or define the inner extremity of the space between the teeth. Accordingly the points of the teeth are substantially directed towards the centre of the slot for practical gripping action, as the case may be with a stud of the diameter which they, as independent groups, are intended to engage.

In the form of construction employing a yieldable body bonded to the basic fastener, it should also be appreciated that while I prefer to chamfer the edges of the opening designed to receive the stud which thus provides an automatic assembly pilot or guide hole, it is of course not essential to the production of a practical fastener that this self locating guide means be employed.

From the foregoing it should be clear that I provide not only a fastener of metallic base which will function to secure readily, plain or threaded studs of varying diameters but a fastener of this kind which will provide as well a body of yieldable nature such as to act as a seal where sealing is required apart from providing shock absorbing and corrosion or acid-resisting characteristics, depending upon the properties of the formable yieldable body employed. Finally, it should be observed that the fastener above described is of simple formation and of such character that it lends itself to production economically by automation.

What I claim as my invention is:

1. A fastener comprising a plate-like element having an elongated slot of greater width at its middle than at its ends, said slot on either side of its major axis being serrated to define a plurality of teeth of pointed substantially equal length measured inwardly from their bases, and bases of said teeth being disposed substantially on an elliptical outline, said teeth being shorter than the transverse minor axis of said slot, the free ends of all said teeth on one side of said slot being spaced apart from the teeth on the other side across the major axis of said slot but all substantially converging towards its center, three of said teeth adjacent to the middle of said slot forming gripping means for small diameter studs, a middle tooth on one side of the slot disposed opposite the space between two middle teeth on the opposite side, said teeth being capable of displacement substantially perpendicular to the plane of the plate-like element by a larger stud having a diameter not greater than the length of the minor axis of said slot, said teeth of said slot on each side of said displaceable middle teeth of said slot forming a means for gripping said larger diameter studs.

2. A fastener as claimed in claim 1 having a body of formable relatively yieldable material bonded to said element substantially embedding said teeth and having an entrant orifice registering with the center of said slot for passage of a stud projected into said slot, said orifice being of a diameter substantially coincided with the diameter of the smallest stud receivable by said slot and retainable by the teeth thereof.

3. A fastener as claimed in claim 2 in which the body is formed with a hollow housing on that side of the element opposite to the entrant orifice and forming a socket for a stud projected through said orifice, said housing being of a diameter at least substantially equal to the diameter of the smallest stud to be enclosed therein, said housing being yieldable to studs of larger diameter to embrace said studs intimately.

References Cited in the file of this patent

UNITED STATES PATENTS

| | | |
|---|---|---|
| 228,816 | Huff | June 15, 1880 |
| 2,169,181 | Kost | Aug. 8, 1939 |
| 2,417,262 | Morehouse | Mar. 11, 1947 |
| 2,462,023 | Johanson | Feb. 15, 1949 |
| 2,480,262 | Purinton | Aug. 30, 1949 |
| 2,535,879 | Tinnerman | Dec. 26, 1950 |
| 2,754,717 | Becker | July 17, 1956 |